United States Patent
Liu et al.

(10) Patent No.: US 12,470,120 B2
(45) Date of Patent: Nov. 11, 2025

(54) NON-COMMUNICATION DISTRIBUTED CONTROL METHOD AND DEVICE FOR CASCADE SYSTEM

(71) Applicant: Delta Electronics (Shanghai) Co., Ltd., Shanghai (CN)

(72) Inventors: Hong Liu, Shanghai (CN); Wen Zhang, Shanghai (CN); Wenfei Hu, Shanghai (CN); Cheng Lu, Shanghai (CN); Hongyang Wu, Shanghai (CN); Baihui Song, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 399 days.

(21) Appl. No.: 18/054,146

(22) Filed: Nov. 10, 2022

(65) Prior Publication Data

US 2023/0179079 A1 Jun. 8, 2023

(30) Foreign Application Priority Data

Dec. 6, 2021 (CN) .......................... 202111479103.7

(51) Int. Cl.
*H02M 1/00* (2007.01)
*H02M 7/04* (2006.01)

(52) U.S. Cl.
CPC ....... *H02M 1/0025* (2021.05); *H02M 1/0009* (2021.05); *H02M 7/04* (2013.01)

(58) Field of Classification Search
CPC ... G05F 1/70; H02J 3/16; H02M 1/42; H02M 1/4208; H02M 1/12; H02M 1/4225; H02M 1/4233; H02M 1/4241; H02M 1/4258; H02M 1/425
See application file for complete search history.

(56) References Cited

U.S. PATENT DOCUMENTS

2017/0054294 A1 2/2017 Lyu et al.

FOREIGN PATENT DOCUMENTS

| CN | 106877710 A | 6/2017 |
|---|---|---|
| CN | 109067003 A | 12/2018 |
| CN | 110571796 A | 12/2019 |

(Continued)

OTHER PUBLICATIONS

CN_112564172_A Translation (Year: 2021).*

(Continued)

*Primary Examiner* — Bryan R Perez
(74) *Attorney, Agent, or Firm* — CKC & Partners Co., LLC

(57) ABSTRACT

The application provides a cascade system distributed control method and device. The method including: taking an output of a closed-loop control for regulating an AC current of the power module as a reference value of a bridge arm voltage; according to the reference value of the bridge arm voltage to obtain an amplitude of the bridge arm voltage, taking the amplitude of the bridge arm voltage as a feedback signal, and after closed-loop control and regulation together with the AC current of the power module, adjusting the reference value of the bridge arm voltage; and controlling the bridge arm voltage according to the reference value of the bridge arm voltage, wherein in at least one working mode of the cascade system, a change of parameters reflecting an active current has a monotonic relation with a change of the amplitude of the bridge arm voltage.

20 Claims, 11 Drawing Sheets

(56) References Cited

FOREIGN PATENT DOCUMENTS

| CN | 112564172 A | * | 3/2021 | ................ H02J 3/01 |
|----|-------------|---|--------|---------------------------|
| CN | 113690914 A |   | 11/2021 | |
| NL | 2026118 B1 |   | 11/2021 | |
| WO | 2020253846 A1 |   | 12/2020 | |

OTHER PUBLICATIONS

He Jinwei et al:"Hierarchical Control of Series-Connected String Converter-Based Islanded Electrical Power System", IEEE Transactions on Power Electronics, Institute of Electrical and Electronics Engineers, USA, vol. 35, No. 1, Jan. 1, 2020 (Jan. 1, 2020) , pp. 359-372.

Yu, Xinyu et al., "Symmetric Steady-State Analysis and Decoupled Control of Three-Phase Three-Wire Modular Multilevel Converters," Automation of Electric Power System, vol. 39, No. 3, Feb. 10, 2015.

* cited by examiner

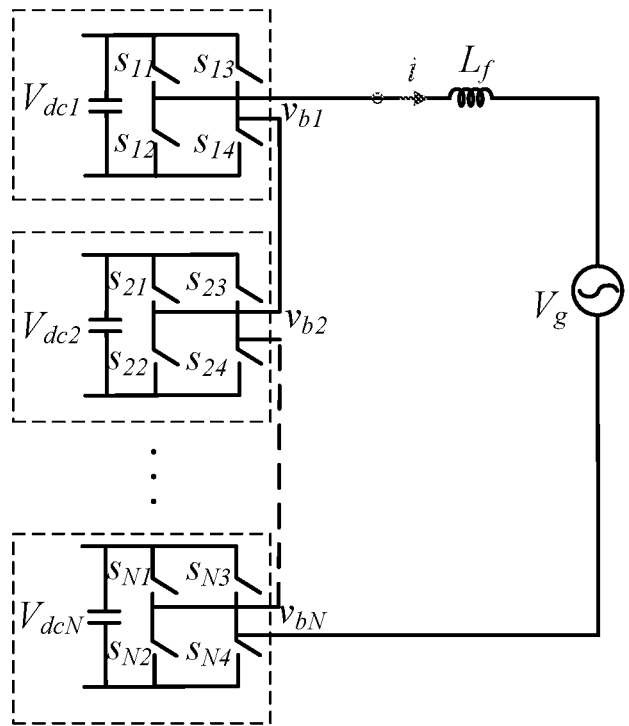

FIG. 1

| S1 | taking an output of a closed-loop control for regulating an AC current of the power module as a reference value of a bridge arm voltage |

| S2 | according to the reference value of the bridge arm voltage, obtaining an amplitude of the bridge arm voltage, taking the obtained amplitude of the bridge arm voltage as a feedback signal, and after closed-loop control and regulation together with the AC current of the power module, adjusting the reference value of the bridge arm voltage according to the output of the closed-loop control for regulating the AC current of the power module and the feedback signal |

| S3 | controlling the bridge arm voltage according to the adjusted reference value of the bridge arm voltage |

FIG. 2

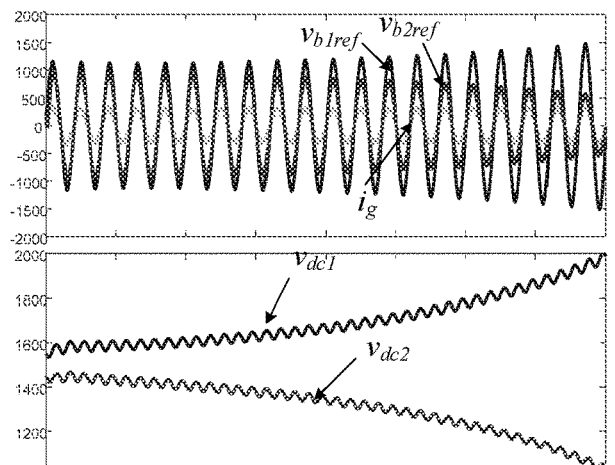
(a)
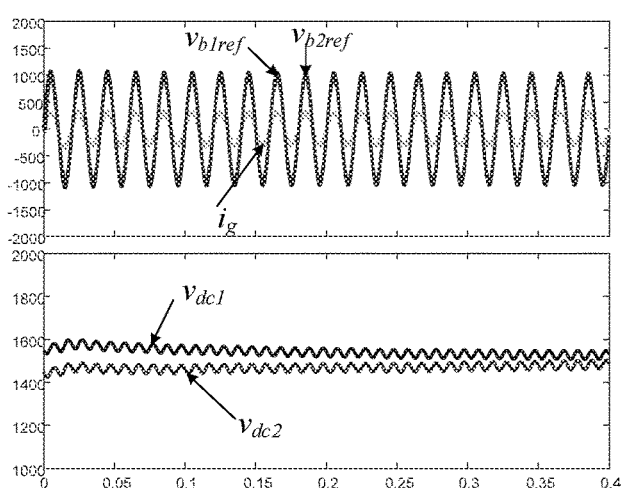
(b)
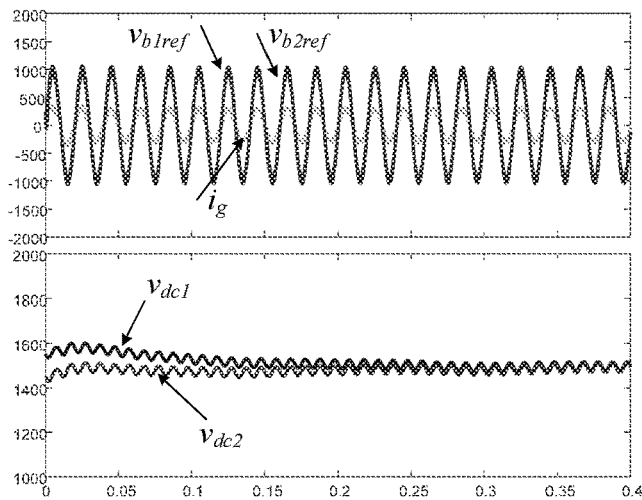
(c)
FIG. 6

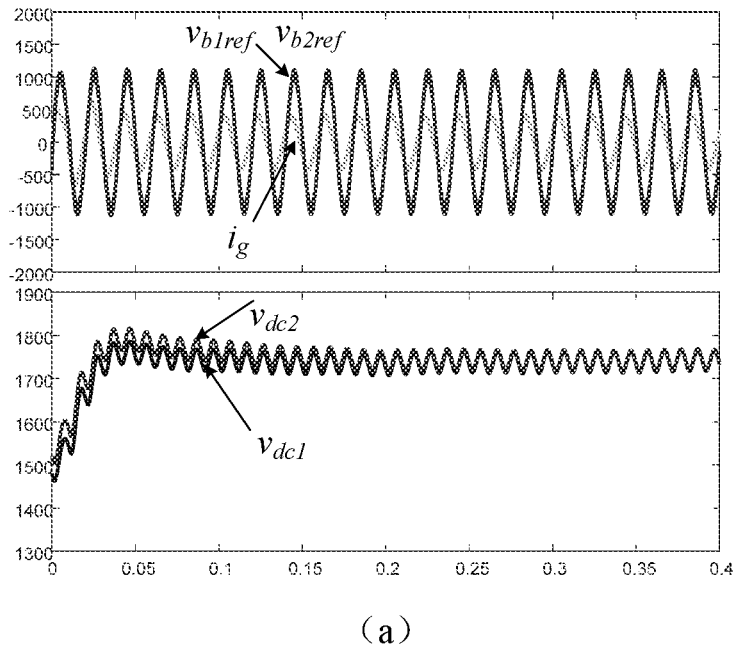
(a)
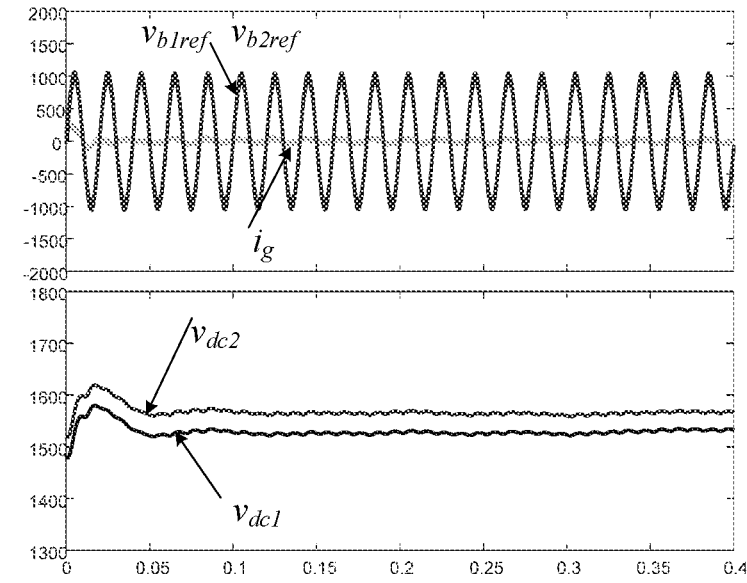
(b)
FIG. 7

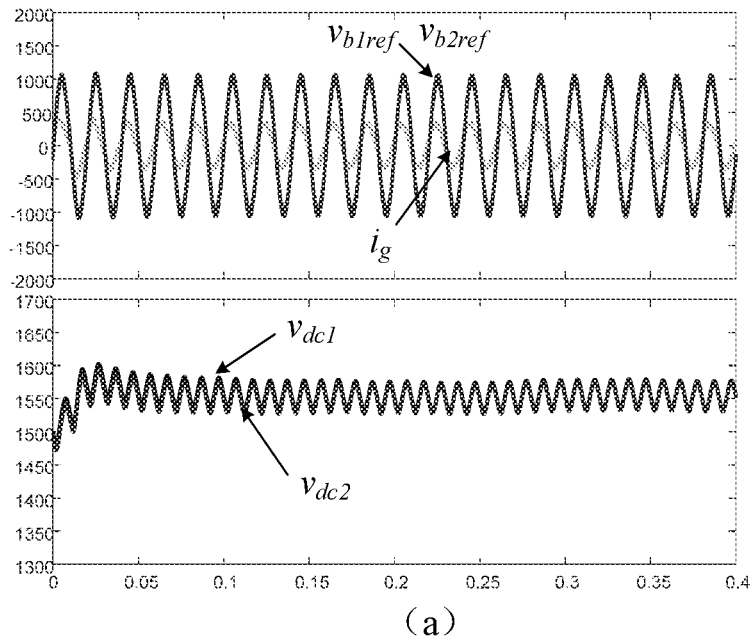
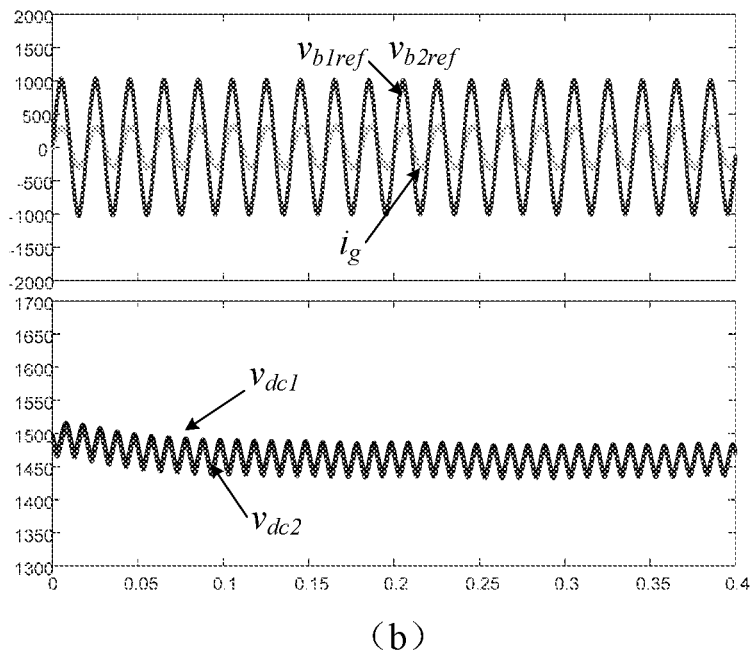
FIG. 8

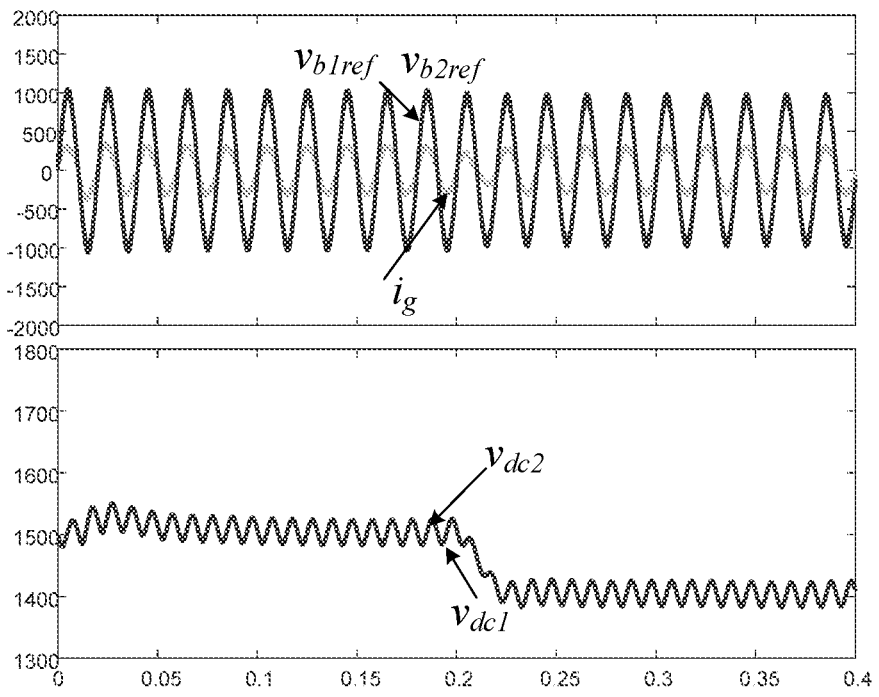
(a)
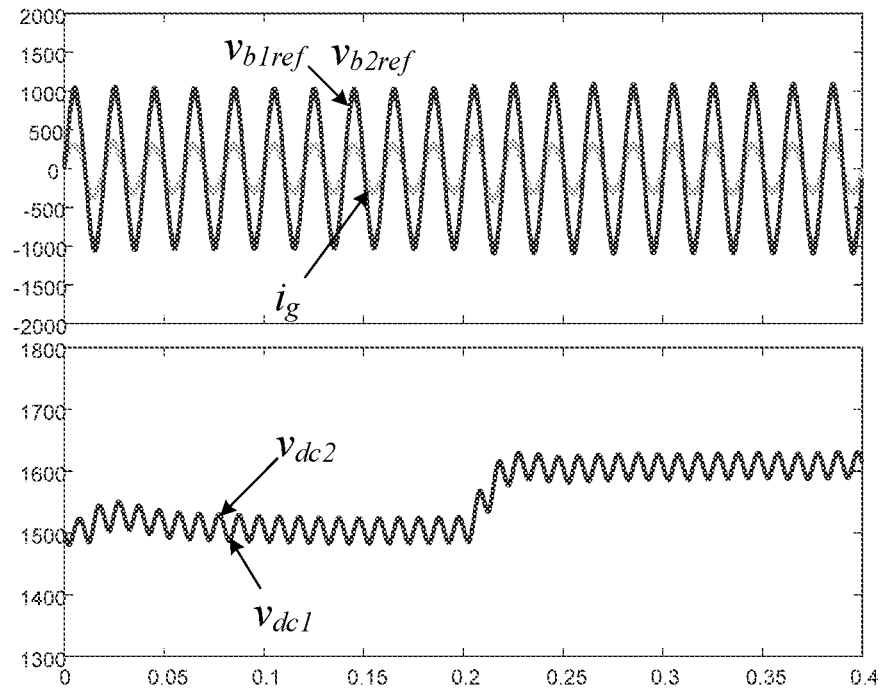
(b)
FIG. 9

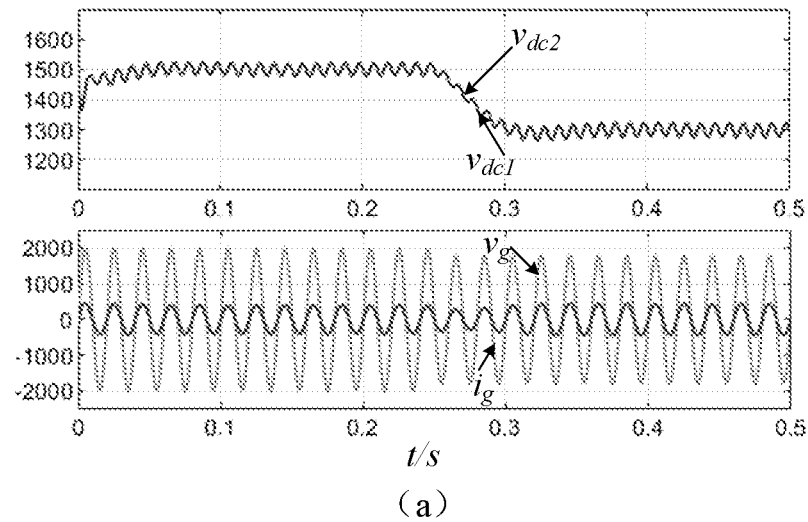
(a)
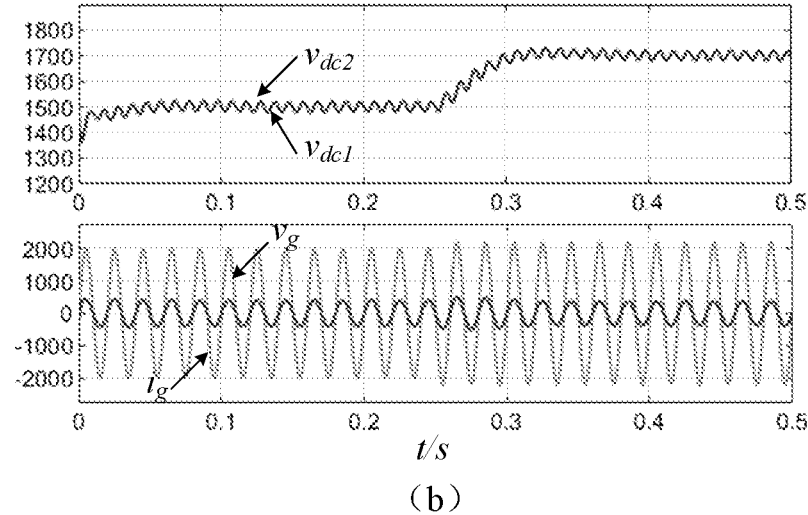
(b)
FIG. 13

NON-COMMUNICATION DISTRIBUTED CONTROL METHOD AND DEVICE FOR CASCADE SYSTEM

CROSS-REFERENCE TO RELATED APPLICATIONS

This non-provisional application claims priority under 35 U.S.C. § 119(a) on Patent Applications No. 202111479103.7 filed on Dec. 6, 2021, in P.R. China, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The application relates to the field of cascade system distributed control technologies, and particularly to a non-communication distributed control method and device for cascade system.

BACKGROUND

In the existing cascade system, controllers are often locally mounted on power modules to form a distributed control system, such that the modular cascade system has good flexibility, extendibility and reliability. However, one important challenge of cascade system distributed control is control of consistency of DC-link voltages of the modules, i.e., voltage sharing control. The conventional voltage sharing control method regulates a bridge arm voltage itself according to a relative size of a voltage of the power module and an average voltage of the modules, and disadvantage of the method is that communication lines shall acquire voltages of other modules, and there is high requirement for reliability of communication. In actual communication, after communication failure, system shall continue to operate stably without depending on communication, or complexity of communication lines of the system shall be reduced without mounting communication, so a higher challenge for control technologies is proposed.

SUMMARY

Under such background, one aspect of the disclosure is to provide a non-communication distributed control method and device for a cascade system, which allows the amplitudes of the bridge arm voltage of the respective power modules to be consistent through a closed-loop control, and since communication coordination is unnecessary between the respective power modules, in case of communication failure, the system also can operate stably.

According to one aspect of the disclosure, a non-communication distributed control method for a cascade system is provided, the cascade system having at least two power modules with each other, and each of the power modules having a control module, the method comprising:

S1, taking an output of a closed-loop control for regulating an AC current of the power module as a reference value of a bridge arm voltage;

S2, according to the reference value of the bridge arm voltage, obtaining an amplitude of the bridge arm voltage, taking the obtained amplitude of the bridge arm voltage as a feedback signal, and after closed-loop control and regulation together with the AC current of the power module, adjusting the reference value of the bridge arm voltage according to the output of the closed-loop control for regulating the AC current of the power module and the feedback signal; and S3, controlling the bridge arm voltage according to the adjusted reference value of the bridge arm voltage, wherein in at least one working mode of the cascade system, a change of parameters reflecting an active current has a monotonic relation with a change of the amplitude of the bridge arm voltage.

A distributed control device for a cascade system, the cascade system having at least two power modules cascaded with each other, each power module having a control module, configured for:

taking an output of a closed-loop control for regulating an AC current of the power module as a reference value of a bridge arm voltage;

according to the reference value of the bridge arm voltage, taking an obtained amplitude of the bridge arm voltage as a feedback signal, and after closed-loop control and regulation together with the AC current of the power module, adjusting the reference of the bridge arm voltage according to the output of the closed-loop control for regulating the AC current of the power module and the feedback signal; and controlling the bridge arm voltage according to the adjusted reference value of the bridge arm voltage, wherein in at least one working mode of the cascade system, a change of parameters reflecting an active current has a monotonic relation with a change of the amplitude of the bridge arm voltage.

The above embodiments may provide a non-communication distributed control method for a cascade system, which controls an output of the loop as the bridge arm voltage by sampling and feedback controlling the AC current, and then allowing the amplitudes of the bridge arm voltage of the power modules to be consistent by observing the amplitudes of the bridge arm voltage and closed-loop control. The method can achieve that parameters reflecting an active current change in a monotonic relation with a change of the bridge arm voltage in at least one working mode of the system, and since communication coordination is unnecessary between the power modules, in case of communication failure, the system also can operate stably.

BRIEF DESCRIPTION OF THE DRAWINGS

The above and other objects, features and advantages of the disclosure are described in detail with reference to the accompanying drawings, and become more apparent, wherein:

FIG. 1 is a principle diagram of a circuit of a cascade system.

FIG. 2 is a flow diagram of the non-communication distributed control method for cascade system according to one embodiment of the disclosure.

FIG. 6 is a control effect diagram under different reverse droop control coefficients.

FIG. 7 is a control effect diagram under different loads.

FIG. 8 is a control effect diagram in different reactive situations.

FIG. 9 is a control effect diagram when a power grid voltage changes.

FIG. 13 is an implementation effect diagram of one embodiment with an A2D stage non-communication distributed control of the SST.

DETAILED DESCRIPTION

Figure 3:
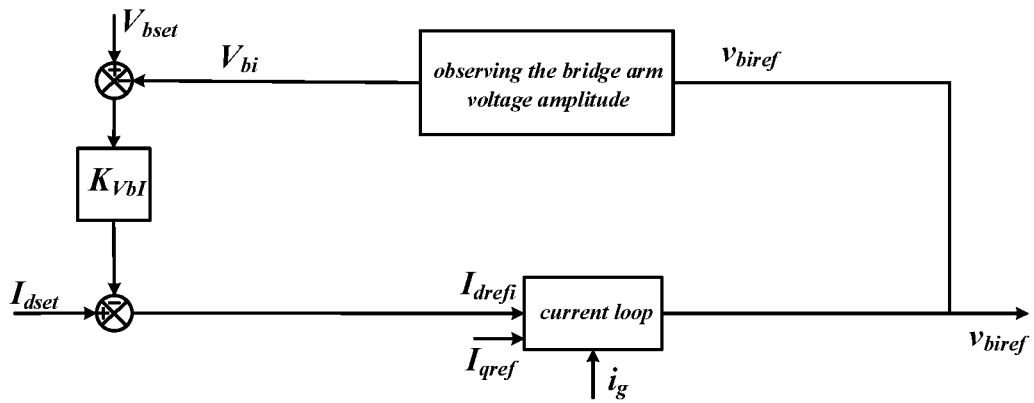
FIG. 3 is an overall logic block diagram of the non-communication distributed control method for cascade system.

To make objects, technical solutions and advantages of the invention clearer, hereinafter the invention is further explained in details with reference to the accompanying drawings and embodiments. It shall be understood that the detailed embodiments described here are only to explain the invention, not limiting the invention.

It shall be noted that when the specification specifies reference signs for elements in the drawings, although the same reference sign is shown in different drawings, the same reference sign represents the same element as could as possible. In addition, in the below description of the disclosure, when detailed descriptions of the known functions and constructions incorporated into the invention make the subject matter of the disclosure quite unclear, the detailed descriptions will be omitted.

Further, when the elements in the disclosure are described, terms such as "first", "second", "A", "B", "(a)", "(b)" and the like may be used. These terms are only to distinguish one element from other elements, and essence, order, sequence, or number of the corresponding element is not limited thereto. When one element is described to be "connected to", "coupled to" or "linked to" another element, it shall be understood that one element can be directly connected or coupled to another element, and also can be "connected to", "coupled to" or "linked to" another element via a third element, or the third element may be interposed between one element and another element.

Still further, with respect to citation of "one embodiment", "embodiments", "exemplary embodiment", or the like, it refers to that the described embodiment may include specific features, structures or characteristics, not that each embodiment must include these specific features, structures or characteristics. In addition, such expression does not refer to the same embodiment. Further, when the specific features, structures or characteristics are described combining with the embodiments, no matter whether they are clearly described, it has indicated that combination of these features, structures or characteristics into other embodiments is within the scope of knowledge of those skilled in the art.

Even further, the specification and subsequent claims use certain phrases to name specific components or parts, and those ordinary in the art shall understood that manufacturers can use different nouns or terms to call the same component or part. The specification and subsequent claims do not distinguish the components or parts with difference of names, but difference in functions as distinguishing criterion. In the whole specification and subsequent claims, "comprise" and "include" mentioned are open words, so they shall be explained to "include but not limited to". Moreover, the word "connect" includes any direct or indirect electrical connection means. Indirect electrical connection means includes connection through other devices.

As an example, as shown in FIGS. 1, 2 and 3, FIG. 1 is a principle diagram of a circuit of a cascade system, FIG. 2 is a flow diagram of a non-communication distributed control method for cascade system according to one embodiment of the disclosure, and FIG. 3 is an overall logic block diagram of the non-communication distributed control method for cascade system.

The cascade system shown in FIG. 1 is formed of at least two power modules cascaded, and voltages $v_{b1}, v_{b2} \ldots v_{bN}$ represent bridge arm voltages of respective power modules.

The control method in this embodiment aims at the non-communication distributed control for cascade system. Each of the power modules comprises a control module, and control manners of the respective power modules are the same. As shown in FIGS. 2 and 3, the method may be realized by step S1 to step S3.

S1, taking an output of a closed-loop control for regulating an AC current of the power module as a reference value of a bridge arm voltage $v_{biref}$;

Wherein the step S1 further includes the following steps:

sampling the AC current; and comparing the AC current with the AC current reference value to generate a current error, and obtaining the reference value of the bridge arm voltage $v_{biref}$ after the current error is regulated by a current regulator, and the sine fundamental signal having the same phase as the bridge arm voltage is added as a feedforward.

S2, according to the reference value of the bridge arm voltage $v_{biref}$, obtaining an amplitude of the bridge arm voltage $v_{bi}$, taking the obtained amplitude of the bridge arm voltage $v_{bi}$ as a feedback signal, and after closed-loop control and regulation together with the AC current of the power module, adjusting the reference value of the bridge arm voltage $v_{biref}$ according to the output of the closed-loop control for regulating the AC current of the power module and the feedback signal;

S3, controlling the bridge arm voltage according to the adjusted reference value of the bridge arm voltage;

wherein in at least one working mode of the cascade system, a change of parameters reflecting an active current has a monotonic relation with a change of the amplitude of the bridge arm voltage.

Since the currents of the cascade system are consistent, the amplitude of the bridge arm voltage reflects the power absorbed by each power module. If the amplitudes of the bridge arm voltage are consistent through closed-loop control, the powers absorbed by the power modules are consistent, and the amplitudes of the bridge arm voltage of the at least two power modules are the same.

Figure 4:
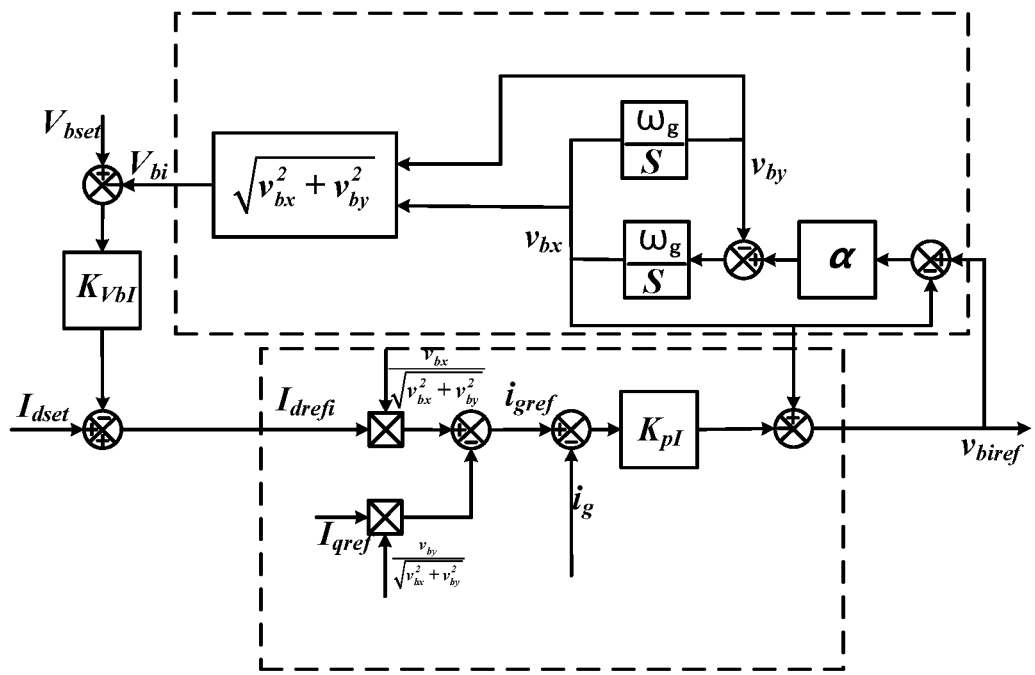
FIG. 4 is a detailed logic block diagram of the non-communication distributed control method for cascade system.

As shown in FIG. 4, FIG. 4 shows a detailed logic block diagram of the non-communication distributed control method for cascade system. In specific implementation, the step S2 specifically includes the following steps:

observing the amplitude of the bridge arm voltage $v_{bi}$ by second-order generalized integral of the reference value of the bridge arm voltage $v_{biref}$;

comparing the amplitude of the bridge arm voltage with a set value of the bridge arm voltage, wherein the following formula is satisfied:

$I_{drefi} = I_{dset} - K_{Vbi}(V_{bset} - V_{bi})$, wherein $I_{drefi}$ is an active current reference value of the ith power module, $I_{dset}$ is an active current set value, which is set to be consistent or zero for the respective modules, $V_{bset}$ is an amplitude set value of the bridge arm voltage, which is a power grid rated voltage, $V_{bi}$ is the amplitude of the bridge arm voltage, $K_{Vbi}$ is an inverse droop coefficient of the active current-bridge arm voltage, and the active current reference value is a parameter reflecting the active current.

Then, an AC current reference value meets the following formula:

$$i_{gref} = I_{dref} \times \frac{v_{bx}}{\sqrt{v_{bx}^2 + v_{by}^2}} - I_{qref} \times \frac{v_{by}}{\sqrt{v_{bx}^2 + v_{by}^2}},$$

wherein $i_{gref}$ is the AC current reference value, $I_{dref}$ is the active current reference value, $I_{qref}$ is the reactive current reference value, the amplitude of the bridge arm voltage is $V_{bi} = \sqrt{v_{bx}^2 + v_{by}^2}$, $v_{bx}$ is a sine fundamental signal having the same phase as the bridge arm voltage, and $v_{by}$ is a sine signal lagged behind $v_{bx}$ by 90 degrees.

The smaller the amplitude of the bridge arm voltage is, the smaller the DC-link voltage set value, i.e., the DC-link voltage reference value will be. As for scenario having a fixed voltage such as the DC-link voltage is a battery, it is possible to sample the current loop control, and the active current set value $I_{dset}$ may be set according to the active current desired by the system. As for scenario where the DC-link voltage is a capacitor, and a DC load changes, the active current set value $I_{dset}$ may be generated by a DC-link voltage loop.

Figure 5:
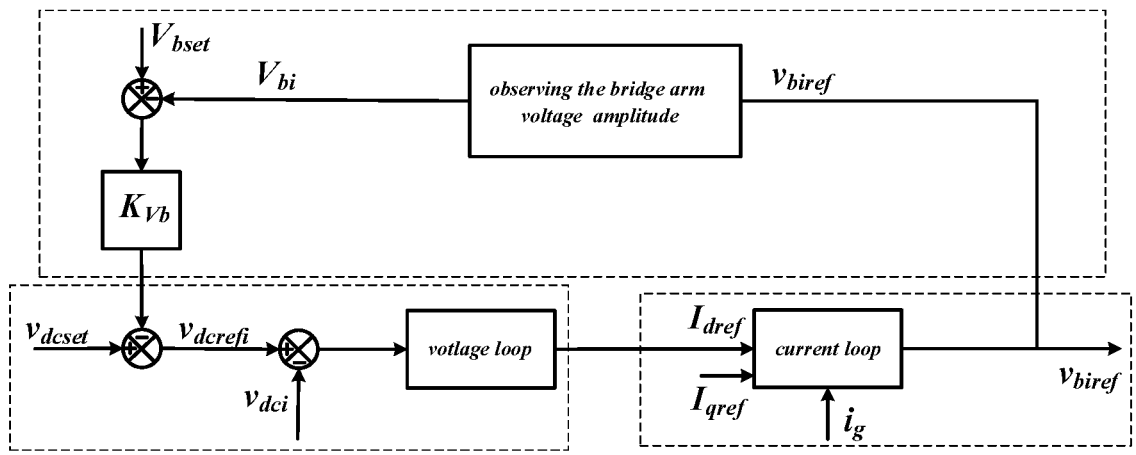
FIG. 5 is a logic block diagram of reverse droop control of a DC-link voltage-bridge arm voltage amplitude.

As shown in FIG. 5, as for scenario where the DC-link voltage shall be controlled, this embodiment further provides that the DC-link voltage-bridge arm amplitude is superposed onto a DC-link voltage reference value using inverse droop control, i.e., comparing the amplitude of the bridge arm voltage $V_{bi}$ with the amplitude set value of the bridge arm voltage $V_{bset}$, wherein the following formula is satisfied:

$v_{dcrefi} = v_{dcset} - K_{vb}(V_{bset} - V_{bi})$;

wherein $v_{dcrefi}$ is a DC-link voltage reference value, $v_{dcset}$ is the DC-link voltage set value, $V_{bset}$ is the amplitude set value of the bridge arm voltage, which may be a power grid rated voltage, $V_{bi}$ is the amplitude of the bridge arm voltage, and $K_{vb}$ is an inverse droop control coefficient. The smaller the amplitude of the bridge arm voltage $V_{bi}$ is, the smaller the DC-link voltage reference value $v_{dcrefi}$ will be.

Design of the inverse droop control system shall consider both stability of the system and a steady state error of the DC-link voltage. The method for designing the inverse droop control coefficient $K_{vb}$ is shown as follows:

establishing a mathematical model of the system under a dq coordinate system as follows, as shown by:

$$L_f \frac{di_{gd}}{dt} = \omega_g L_f i_{gq} + v_{gd} - v_{bd1} - v_{bd2}$$

$$L_f \frac{di_{gq}}{dt} = -\omega_g L_f i_{gd} + v_{gq} - v_{bq1} - v_{bq2}$$

$$v_{dc1} C_{dc} \frac{dv_{dc1}}{dt} = \frac{v_{bd1} i_{gd} + v_{bq1} i_{gq}}{2} - v_{dc1} i_{dc1}$$

$$v_{dc2} C_{dc} \frac{dv_{dc2}}{dt} = \frac{v_{bd2} i_{gd} + v_{bq2} i_{gq}}{2} - v_{dc2} i_{dc2}$$

A model of control equation is as follows:

$v_{bd1} = -K_{pI}(K_{pVdc}(v_{dcset} - K_{Vb}(V_{bset} - V_{b1}) - v_{dc1}) - i_{gd}) + V_{b1}$ A model of an observer of the bridge arm voltage is as follows:

$$V_{b1} = \frac{\gamma}{s + \gamma} v_{bd1}$$

According to the equations, a model of differential mode may be obtained as follows, as shown by:

$$\frac{d(v_{dc1} - v_{dc2})}{dt} = \frac{b_1 s + b_0}{s + a_0}(v_{dc1} - v_{dc2})e^{-T_d s}$$

Wherein, $$a_0 = K_{pI} K_{pVdc} K_{Vb} \gamma, \quad b_0 = \frac{K_{pI} K_{pVdc} \gamma (1 - mK_{Vb})}{m} \frac{i_{dc}}{V_{dc} C_{dc}},$$

$$b_1 = \frac{(K_{pI} K_{pVdc} - m)}{m} \frac{i_{dc}}{V_{dc} C_{dc}}.$$

Conditions of stability are $b_0 < 0, 1 + b_1 T_d > 0, a_0 - b_1 + b_0 T_d > 0$.

As can be known from $b_0 < 0$, when $i_{dc} > 0$, i.e., during rectifier operation, $$K_{Vb} > \frac{1}{m}$$

shall be satisfied.

In addition, excessive inverse droop coefficient allows a static difference of the DC-link voltage to be too large, so design of the inverse droop coefficient shall be compromised, and a preferable range is [2, 5].

Taking rectification of the cascade system formed of two power modules for example, FIG. 6 is control effect under different reverse droop control coefficients. When $K_{Vb}=1$ as shown in figure (a), the system is instable, and errors of the DC-link voltages $v_{dc1}$ and $v_{dc2}$ of the two power modules become larger, and hence are scattered. When $K_{Vb}=2$, as shown in figure (b), the system is stable, but a rate of convergence is slow, and when $K_{Vb}=5$, the rate of convergence is fast, as shown in figure (c). FIG. 7 shows control effect under different loads, wherein figure (a) shows a heavy load state, $i_{dc}=10$ A, and the heavier it is, the faster the convergence will be; figure (b) shows a light load state, $i_{dc}=1$ A, and the system is also stable in the light load. FIG. 8 is control effect in reactive situations, wherein figure (a) shows a state of absorbing reactive power, figure (b) shows a state of generating reactive power, and the system is stable when absorbing reactive power and generating reactive power. FIG. 9 is control effect when a power grid voltage changes, wherein figure (a) shows a state where the power grid voltage drops by 5%, and figure (b) shows a state where the power grid voltage rises by 5%. When the figures show a change of the power grid voltage, the DC-link voltage has a steady state error, because since the control method often cannot acquire the power grid voltage in case of no communication, and the amplitude set value of the bridge arm voltage does not timely change along with a change of the amplitude of the power grid voltage.

Figure 10:
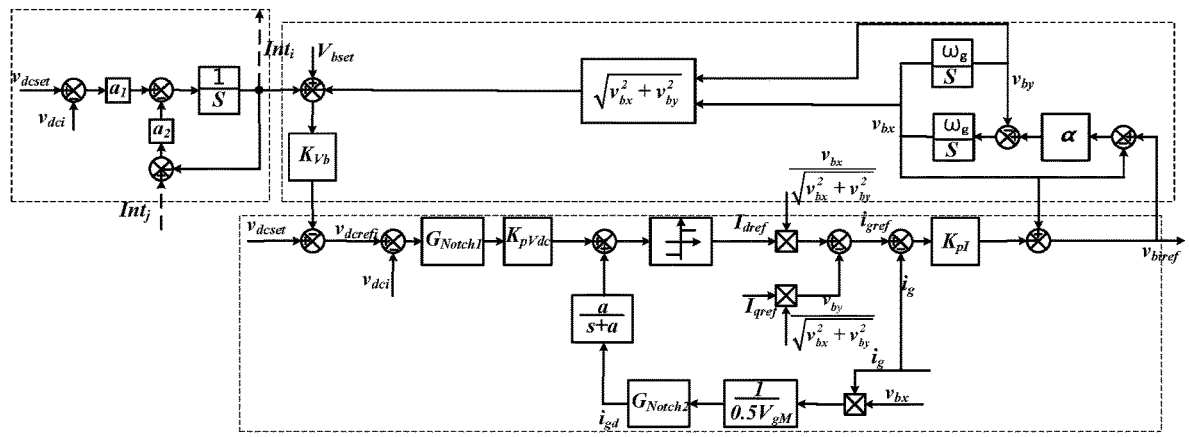
FIG. 10 is a logic block diagram of the cascade system distributed control method in a communication mode.
Figure 11:
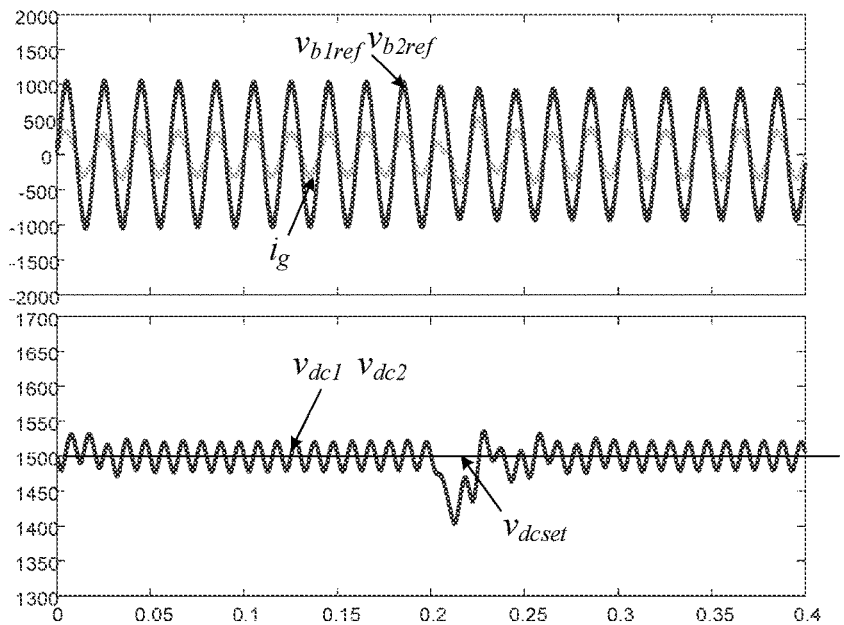
FIG. 11 is an implementation effect diagram of one embodiment having coordination integral.

The control method provided in the above embodiments aims at control in the non-communication distributed mode for cascade system, and in the case of communication coordination between the control modules of the respective power modules, as shown in FIG. 10, FIG. 10 is a logic block diagram in the case of communication coordination between the control modules of the respective power module of the cascade system according to one embodiment of the disclosure. On the basis of non-communication distributed control method in the above embodiments, the DC-link voltage set value $v_{dcset}$ is compared with the DC-link voltage $v_{dci}$, while a DC-link voltage integral state component $Int_j$ of another power module is compared with a DC-link voltage integral state component $Int_i$ of the module. After coordination integral, a DC-link voltage integral state component $Int_i$ is generated to be superposed onto the amplitude set value of the bridge arm $v_{dcset}$. FIG. 11 shows implementation effect in one embodiment having coordination integral. In the case of communication coordination between the control modules of the respective power modules, the control method having coordination integral can be used, i.e., a steady state also does not have a steady state error. In case of communication failure, integral is no longer performed, and the distributed control method in non-communication mode in the above embodiments is degraded, such that the system continues to operate stably, thereby greatly improving reliability of the system.

Figure 12:
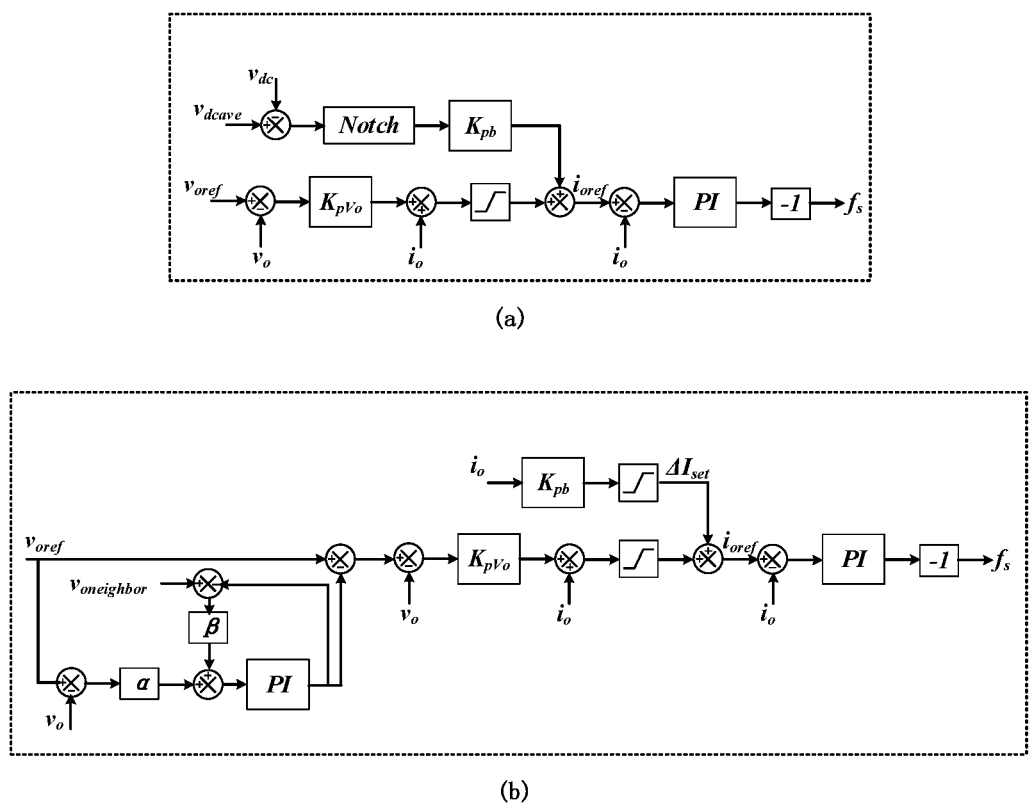
FIG. 12 is a control block diagram of a DC-DC converter of a SST cascade system.

The control method provided in the invention can be applied to a SST cascade system. The SST cascade system includes an AC-DC converter and a DC-DC converter, wherein the AC-DC converter is controlled by the cascade system non-communication distributed control method shown in FIG. 4, and the DC-DC converter may use a DC-link voltage droop control or an output current droop control as well as a secondary regulation loop. FIG. 12 is a control block diagram of a DC-DC converter of the SST cascade system, wherein figure (a) shows the DC-link voltage droop control, and figure (b) shows droop control as well as the secondary regulation loop. Specific methods are not described in the application. FIG. 13 is implementation effect of an AC-DC stage non-communication distributed control in the SST, wherein figure (a) shows a state where the power grid voltage drops by 10%, and figure (b) shows a state where the power grid voltage rises by 10%. When the power grid voltage changes, the DC-link voltage has a certain steady state error. Since the power grid voltage is not sampled in control, the amplitude set value of the bridge arm voltage does not timely change along with a change of amplitude of the power grid voltage. Such steady state error is just the feature of inverse droop, and the SST can operate stably.

Figure 14:
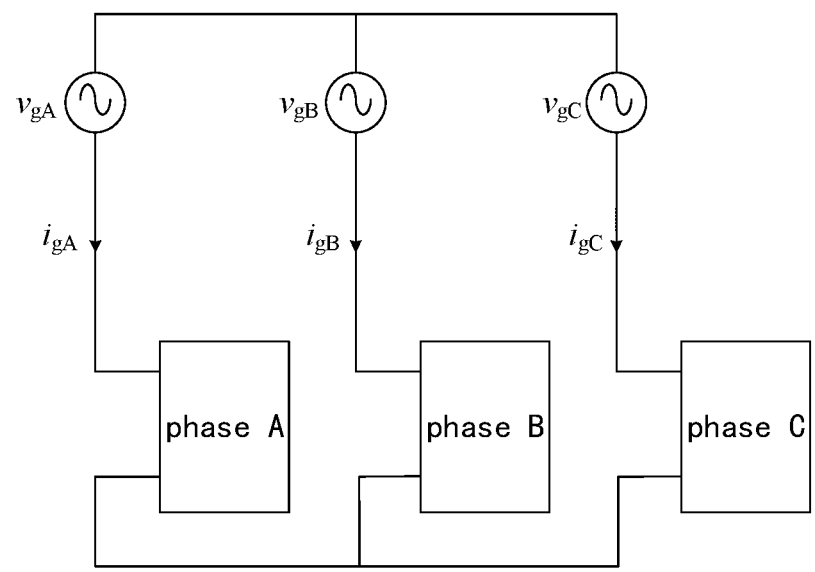
FIG. 14 is a principle block diagram of a three-phase cascade system.

The application further provides a three-phase system non-communication distributed control method, and a principle diagram of the three-phase cascade system is shown in FIG. 14, wherein each phase comprises at least one power module, and each power module includes a control module. The control module samples and feedback controls an AC current of the power module, an output of the power module is a bridge arm voltage, and the control module observes an amplitude of the bridge arm voltage and makes closed-loop control, wherein in at least one working mode of the cascade system, parameters reflecting an active current change in a monotonic relation along with a change of the bridge arm voltage.

As shown in FIGS. 2 and 3, the method may be realized by step S1 to step S3.

S1, taking an output of a closed-loop control for regulating an AC current of the power module as a reference value of a bridge arm voltage $v_{biref}$,
wherein the step S1 further includes the following steps: sampling the AC current; and
comparing the AC current with the AC current reference value to generate a current error, and obtaining the reference value of the bridge arm voltage $v_{biref}$ after the current error is regulated by a current regulator, and the sine fundamental signal having the same phase as the bridge arm voltage is added as a feedforward.

S2, according to the reference value of the bridge arm voltage $v_{biref}$, obtaining an amplitude of the bridge arm voltage $v_{bi}$, taking the obtained amplitude of the bridge arm voltage $v_{bi}$ as a feedback signal, and after closed-loop control and regulation together with the AC current of the power module, adjusting the reference value of the bridge arm voltage $v_{biref}$ according to the output of the closed-loop control for regulating the AC current of the power module and the feedback signal;

S3, controlling the bridge arm voltage according to the adjusted reference of the bridge arm bridge;
wherein in at least one working mode of the cascade system, a change of parameters reflecting an active current has a monotonic relation with a change of the amplitude of the bridge arm voltage.

Since the currents of the cascade system are consistent, the amplitude of the bridge arm voltage reflects the power absorbed by each power module. If the amplitudes of the bridge arm voltage are consistent through closed-loop control, the powers absorbed by the power modules are consistent, and the amplitudes of the bridge arm voltage of the at least two power modules are the same.

As shown in FIG. 4, FIG. 4 shows a detailed logic block diagram of the cascade system non-communication distributed control method. In specific implementation, step S2 specifically includes the following steps:

observing the amplitude of the bridge arm voltage $v_{bi}$ by second-order generalized integral of the reference value of the bridge arm voltage $v_{biref}$;
comparing the amplitude of the bridge arm voltage with an amplitude set value of the bridge arm voltage, wherein the following formula is satisfied:

$$I_{drefi}=I_{dset}-K_{Vbi}(V_{bset}-V_{bi}),$$

wherein $I_{drefi}$ is an active current reference value of the ith power module, $I_{dset}$ is an active current set value, which is set to be consistent or zero for the respective modules, $V_{bset}$ is an amplitude set value of the bridge arm voltage, which is a power grid rated voltage, $V_{bi}$ is the amplitude of the bridge arm voltage, $K_{Vbi}$ is an inverse droop coefficient of the active current-bridge arm voltage, and the active current reference value is a parameter reflecting the active current.

Then, an AC current reference value meets the following formula:

$$i_{gref} = I_{dref} \times \frac{v_{bx}}{\sqrt{v_{bx}^2 + v_{by}^2}} - I_{qref} \times \frac{v_{by}}{\sqrt{v_{bx}^2 + v_{by}^2}},$$

wherein $i_{gref}$ is the AC current reference value, $I_{dref}$ is the active current reference value, $I_{qref}$ is the reactive current reference value, the amplitude of the bridge arm voltage is $V_{bi}=\sqrt{v_{bx}^2+v_{by}^2}$, $v_{bx}$ is a sine fundamental signal having the same phase as the bridge arm voltage, and $v_{by}$ is a sine signal lagged behind $v_{bx}$ by 90 degrees.

The smaller the amplitude of the bridge arm voltage is, the smaller the DC-link voltage set value, i.e., the DC-link voltage reference value will be. As for scenario having a fixed voltage such as the DC-link voltage is a battery, it is possible to sample the current loop control, and the active current set value $I_{dset}$ may be set according to the active current desired by the system. As for scenario where the DC-link voltage is a capacitor, and a DC load changes, the active current set value $I_{dset}$ may be generated by a DC-link voltage loop.

As shown in FIG. 5, as for scenario where the DC-link voltage shall be controlled, this embodiment further provides that the DC-link voltage-bridge arm amplitude is superposed onto a DC-link voltage reference value using inverse droop control, i.e., comparing the amplitude of the bridge arm voltage $V_{bi}$ with the amplitude set value of the bridge arm voltage $V_{bset}$, wherein the following formula is satisfied:

$$v_{dcrefi}=v_{dcset}-K_{vb}(V_{bset}-V_{bi});$$

wherein $v_{dcrefi}$ is a DC-link voltage reference value, $v_{dcset}$ is the DC-link voltage set value, $V_{bset}$ is the amplitude set value of the bridge arm voltage, which may be a power grid rated voltage, $V_{bi}$ is the amplitude of the bridge arm voltage, and $K_{vb}$ is an inverse droop control coefficient. The smaller the amplitude of the bridge arm voltage $V_{bi}$ is, the smaller the DC-link voltage reference value $v_{dcrefi}$ will be.

The application further provides a non-communication distributed control device for cascade system, wherein at least two power modules are cascaded to form a cascade system, and each of the power modules comprise a control module configured for:

taking an output of a closed-loop control for regulating an AC current of the power module as a reference value of bridge arm voltage;

according to the reference value of the bridge arm voltage, obtaining an amplitude of the bridge arm voltage, taking the obtained amplitude of the bridge arm voltage as a feedback signal, and after closed-loop control and regulation together with the AC current of the power module, adjusting the reference value of the bridge arm voltage according to the output of the closed-loop control for regulating the AC current of the power module and the feedback signal; and controlling the bridge arm voltage according to the adjusted reference value of the bridge arm voltage, wherein in at least one working mode of the cascade system, a change of parameters reflecting an active current has a monotonic relation with a change of the amplitude of the bridge arm voltage.

Optionally, according to the reference value of the bridge arm voltage, obtaining an amplitude of the bridge arm voltage, taking the obtained amplitude of the bridge arm voltage as a feedback signal, and after closed-loop control and regulation together with the AC current of the power module, adjusting the reference value of the bridge arm voltage according to the output of the closed-loop control for regulating the AC current of the power module and the feedback signal, comprising:

comparing the amplitude of the bridge arm voltage with an amplitude set value of the bridge arm voltage, wherein the following formula is satisfied:

$$I_{drefi}=I_{dset}-K_{Vbl}(V_{bset}-V_{bi}),$$

wherein $I_{drefi}$ is an active current reference value of the ith power module, $I_{dset}$ is an active current set value, $V_{bset}$ is an amplitude set value of the bridge arm voltage, $V_{bi}$ is the amplitude of the bridge arm voltage, $K_{Vbl}$ is an inverse droop coefficient of the active current-bridge arm voltage, and the active current reference value is a parameter reflecting the active current.

Optionally, an AC current value meets the following formula:

$$i_{gref}=I_{dref}\times\frac{v_{bx}}{\sqrt{v_{bx}^2+v_{by}^2}}-I_{qref}\times\frac{v_{by}}{\sqrt{v_{bx}^2+v_{by}^2}},$$

wherein $i_{gref}$ is the AC current reference value, $I_{dref}$ is the active current reference value, $I_{qref}$ is the reactive current reference value, the amplitude of the bridge arm voltage is $V_{bi}=\sqrt{v_{bx}^2+v_{by}^2}$, $v_{bx}$ is a sine fundamental signal having the same phase as the bridge arm voltage, and $v_{by}$ is a sine signal lagged behind $v_{bx}$ by 90 degrees.

In some embodiments, optionally, taking an output of a closed-loop control for regulating an AC current of the power module as a reference value of a bridge arm voltage, further includes the following steps:

sampling the AC current; and comparing the AC current with the AC current reference value to generate a current error, and obtaining the reference value of the bridge arm voltage after the current error is regulated by a current regulator, and the sine fundamental signal having the same phase as the bridge arm voltage is added as a feedforward.

In some embodiments, the step of according to the reference value of the bridge arm voltage, obtaining an amplitude of the bridge arm voltage, taking the obtained amplitude of the bridge arm voltage as a feedback signal, and after closed-loop control and regulation together with the AC current of the power module, adjusting the reference value of the bridge arm voltage according to the output of the closed-loop control for regulating the AC current of the power module and the feedback signal further includes the following steps:

Observing the amplitude of the bridge arm voltage after second-order generalized integral of the reference value of the bridge arm voltage.

In some embodiments, the control module is further configured for:

comparing the amplitude of the bridge arm voltage with the amplitude set value of the bridge arm voltage, wherein the following formula is satisfied:

$$v_{dcrefi}=v_{dcset}-K_{vb}(V_{bset}-V_{bi});$$

wherein $v_{dcrefi}$ is a DC-link voltage reference value, $v_{dcset}$ is the DC-link voltage set value, $V_{bset}$ is the amplitude set value of the bridge arm voltage, $V_{bi}$ is the amplitude of the bridge arm voltage, and $K_{vb}$ is an inverse droop control coefficient.

Optionally, the control module is further configured for: in the case of communication coordination between control modules of the respective power modules, comparing a DC-link voltage with the DC-link voltage set value to generate a DC-link voltage error, and taking an initial DC-link voltage error of another power module as a feedforward to be superposed onto the amplitude set value of the bridge arm voltage after coordination integral.

The above descriptions and drawings only provide examples as the technical concept of the disclosure, and those ordinary in the art shall understand that without departing from essential features of the disclosure, various modifications and changes in form may be made to the embodiments described above, such as, combination, separation, substitution and change of the construction. Therefore, the embodiments disclosed in the disclosure do not aim to limit but describing the technical concept of the disclosure, so the scope of the technical concept of the disclosure is not limited. The scope of the disclosure shall be explained based on the appended claims, and all technical concepts included in the equivalent scope of the appended claims shall be explained to be included into the scope of the disclosure.

Of course, the invention may further have various other embodiments, and those skilled in the art shall make various corresponding modifications and variations to the invention without departing from spirit and essence of the invention, but these corresponding modifications and variations shall belong to the scope protected by the appended claims of the invention.

What is claimed is:

1. A distributed control method for a cascade system, the cascade system having at least two power modules cascaded with each other, and each of the power modules having a control module, the method comprising:

S1, taking an output of a closed-loop control for regulating an AC current of the power module as a reference value of a bridge arm voltage;

S2, according to the reference value of the bridge arm voltage, obtaining an amplitude of the bridge arm voltage, taking the obtained amplitude of the bridge arm voltage as a feedback signal, comparing the amplitude of the bridge arm voltage with a set value of the bridge arm voltage, and then superimposed on the active current set value in the form of reverse droop to obtain the active current reference value, and after closed-loop control and regulation together with the AC current of the power module, adjusting the reference value of the bridge arm voltage according to the output of the closed-loop control for regulating the AC current of the power module and the feedback signal; and S3, controlling the bridge arm voltage according to the adjusted reference value of the bridge arm voltage, wherein in at least one working mode of the cascade system, a change of parameters reflecting an active current has a monotonic relation with a change of the amplitude of the bridge arm voltage.

2. The method according to claim 1, wherein comparing the amplitude of the bridge arm voltage with a set value of the bridge arm voltage, the following formula is satisfied:

$$I_{drefi}=I_{dset}-K_{Vbi}(V_{bset}-V_{bi})$$

wherein $I_{drefi}$ is an active current reference value of the ith power module, $I_{dset}$ is the active current set value, $V_{bset}$ is a bridge arm voltage amplitude set value, $V_{bi}$ is the bridge arm voltage amplitude, $K_{Vbi}$ is an inverse droop coefficient of the active current-bridge arm voltage, and the active current reference value is a parameter reflecting the active current.

3. The method according to claim 2, wherein the set value $V_{bset}$ of the bridge arm voltage is a power grid rated voltage.

4. The method according to claim 2, wherein an AC current reference value meets the following formula:

$$i_{gref} = I_{dref} \times \frac{v_{bx}}{\sqrt{v_{bx}^2 + v_{by}^2}} - I_{qref} \times \frac{v_{by}}{\sqrt{v_{bx}^2 + v_{by}^2}}$$

wherein $i_{gref}$ is the AC current reference value, $I_{dref}$ is the active current reference value, $I_{qref}$ is the reactive current reference value, the bridge arm voltage amplitude is $V_{bi}=\sqrt{v_{bx}^2+v_{by}^2}$, $v_{bx}$ is a sine fundamental signal having the same phase as the bridge arm voltage, and $v_{by}$ is a sine signal lagged behind $v_{bx}$ by 90 degrees.

5. The method according to claim 4, wherein the step S1 further comprising:

sampling the AC current; and
    comparing the AC current with the AC current reference value to generate a current error, and obtaining the reference value of the bridge arm voltage after the current error is regulated by a current regulator, and the sine fundamental signal having the same phase as the bridge arm voltage is added as a feedforward.

6. The method according to claim 1, wherein the step S2 further comprising:

observing the amplitude of the bridge arm voltage by second-order generalized integral of a bridge arm voltage amplitude reference value.

7. The method according to claim 1, further comprising:
    comparing the amplitude of the bridge arm voltage with a set value of the bridge arm voltage, wherein the following formula is satisfied:

$$v_{dcrefi}=v_{dcset}-K_{vb}(V_{bset}-V_{bi})$$

wherein $v_{dcrefi}$ is a DC-link voltage reference value, $v_{dcset}$ is the DC-link voltage set value, $V_{bset}$ is the bridge arm voltage amplitude set value, $V_{bi}$ is the bridge arm voltage amplitude, and $K_{vb}$ is an inverse droop control coefficient.

8. The method according to claim 7, further comprising:
    in the case of communication coordination between control modules of the respective power modules, comparing a DC-link voltage with the DC-link voltage set value to generate a DC-link voltage error, and taking an initial DC-link voltage error of another power module as a feedforward to be superposed onto the bridge arm voltage amplitude set value after coordination integral.

9. The method according to claim 8, wherein the bridge arm voltage amplitudes of the at least two power modules are the same.

10. The method according to claim 1, wherein the power module comprises an AC-DC converter and a DC-DC converter, and the AC-DC converter is controlled by the distributed control method for the cascade system without requiring communication.

11. The method according to claim 10, wherein the DC-DC converter uses a DC-link voltage droop control or an output current droop control.

12. The method according to claim 11, wherein control of the DC-DC converter further comprises a secondary regulation loop.

13. The method according to claim 1, the cascade system including a three-phase system, wherein each phase of the three-phase system having at least one power module, and each power module having a control module.

14. A distributed control device for a cascade system, the cascade system having at least two power modules cascaded with each other, and each of the power modules having a control module, configured for:
  taking an output of a closed-loop control for regulating an AC current of the power module as a reference value of a bridge arm voltage;
  according to the reference value of the bridge arm voltage, taking an obtained amplitude of the bridge arm voltage as a feedback signal, comparing the amplitude of the bridge arm voltage with a set value of the bridge arm voltage, and then superimposed on the active current set value in the form of reverse droop to obtain the active current reference value, and after closed-loop control and regulation together with the AC current of the power module, adjusting the reference value of the bridge arm voltage according to the output of the closed-loop control for regulating the AC current of the power module and the feedback signal; and
  controlling the bridge arm voltage according to the adjusted reference value of the bridge arm voltage,
  wherein in at least one working mode of the cascade system, a change of parameters reflecting an active current has a monotonic relation with a change of the amplitude of the bridge arm voltage.

15. The device according to claim 14
  comparing the amplitude of the bridge arm voltage with an amplitude set value of the bridge arm voltage, wherein the following formula is satisfied:

$$I_{drefi}=I_{dset}-K_{Vbi}(V_{bset}-V_{bi})$$

wherein $I_{drefi}$ is an active current reference value of the ith power module, $I_{dset}$ is the active current set value, $V_{bset}$ is the amplitude set value of the bridge arm voltage, $V_{bi}$ is the amplitude of the bridge arm voltage, $K_{Vbi}$ is an inverse droop coefficient of the active current-bridge arm voltage, and the active current reference value is a parameter reflecting the active current.

16. The device according to claim 15, wherein an AC current reference value meets the following formula:

$$i_{gref} = I_{dref} \times \frac{v_{bx}}{\sqrt{v_{bx}^2 + v_{by}^2}} - I_{qref} \times \frac{v_{by}}{\sqrt{v_{bx}^2 + v_{by}^2}}$$

wherein $i_{gref}$ is the AC current reference value, $I_{dref}$ is the active current reference value, $I_{qref}$ is the reactive current reference value, the amplitude of the bridge arm voltage is $V_{bi}=\sqrt{v_{bx}^2+v_{by}^2}$, $v_{bx}$ is a sine fundamental signal having the same phase as the bridge arm voltage, and $v_{by}$ is a sine signal lagged behind $v_{bx}$ by 90 degrees.

17. The device according to claim 16, taking an output of a closed-loop control for regulating an AC current of the power module as a reference value of a bridge arm voltage, comprising:
  sampling the AC current; and
  comparing the AC current with the AC current reference value to generate a current error, and obtaining the reference value of the bridge arm voltage after the current error is regulated by a current regulator, and the sine fundamental signal having the same phase as the bridge arm voltage is added as a feedforward.

18. The device according to claim 14, according to the reference value of the bridge arm voltage, obtaining an amplitude of the bridge arm voltage, taking the obtained amplitude of the bridge arm voltage as a feedback signal, and after closed-loop control and regulation together with the AC current of the power module, adjusting the reference value of the bridge arm voltage according to the output of the closed-loop control for regulating the AC current of the power module and the feedback signal, further comprising:
  observing the amplitude of the bridge arm voltage by second-order generalized integral of the reference value of the bridge arm voltage.

19. The device according to claim 14, wherein the control module is further configured for:
  comparing the amplitude of the bridge arm voltage with the amplitude set value of the bridge arm voltage, wherein the following formula is satisfied:

$$v_{dcrefi}=v_{dcset}-K_{vb}(V_{bset}-V_{bi})$$

wherein $v_{dcrefi}$ is a DC-link voltage reference value, $v_{dcset}$ is the DC-link voltage set value, $V_{bset}$ is the amplitude set value of the bridge arm voltage, $V_{bi}$ is the amplitude of the bridge arm voltage, and $K_{vb}$ is an inverse droop control coefficient.

20. The device according to claim 19, wherein the control module is further configured for:
  in the case of communication coordination between control modules of the respective power modules, comparing a DC-link voltage with the DC-link voltage set value to generate a DC-link voltage error, and taking an initial DC-link voltage error of another power module as a feedforward to be superposed onto the amplitude set value of the bridge arm voltage after coordination integral.

* * * * *